United States Patent [19]
Hughes

[11] Patent Number: 5,921,735
[45] Date of Patent: Jul. 13, 1999

[54] LOBULAR FASTENER WITH RECTILINEAR PITCH PROFILE

[75] Inventor: Barry J. Hughes, Gloucester, Mass.

[73] Assignee: Phillips Screw Company, Wakefield, Mass.

[21] Appl. No.: 09/136,665

[22] Filed: Aug. 19, 1998

[51] Int. Cl.⁶ ............... F16B 25/00; F16B 35/04
[52] U.S. Cl. ............ 411/411; 411/386; 411/416; 411/426
[58] Field of Search .................... 411/386, 387, 411/411, 414, 416, 426, 387.4

[56] References Cited

U.S. PATENT DOCUMENTS

| | | | |
|---|---|---|---|
| 3,180,126 | 4/1965 | Carlson | 411/416 X |
| 3,246,556 | 4/1966 | Phipard, Jr. | 411/416 |
| 4,040,328 | 8/1977 | Muenchinger | 411/416 X |

FOREIGN PATENT DOCUMENTS 1113064  5/1968  United Kingdom ............... 411/416

*Primary Examiner*—Neill Wilson
*Attorney, Agent, or Firm*—Perman & Green, LLP

[57] ABSTRACT

A fastener is constructed having four thread zones constructed over the length of the fastener, from the head to the tip, namely a ridged cylindrical holding zone, a ridged cylindrical transition thread forming zone, a rectilobular tapered thread forming zone, and a rectilobular alignment zone. The pitch cross section of the thread varies in each zone.

15 Claims, 6 Drawing Sheets

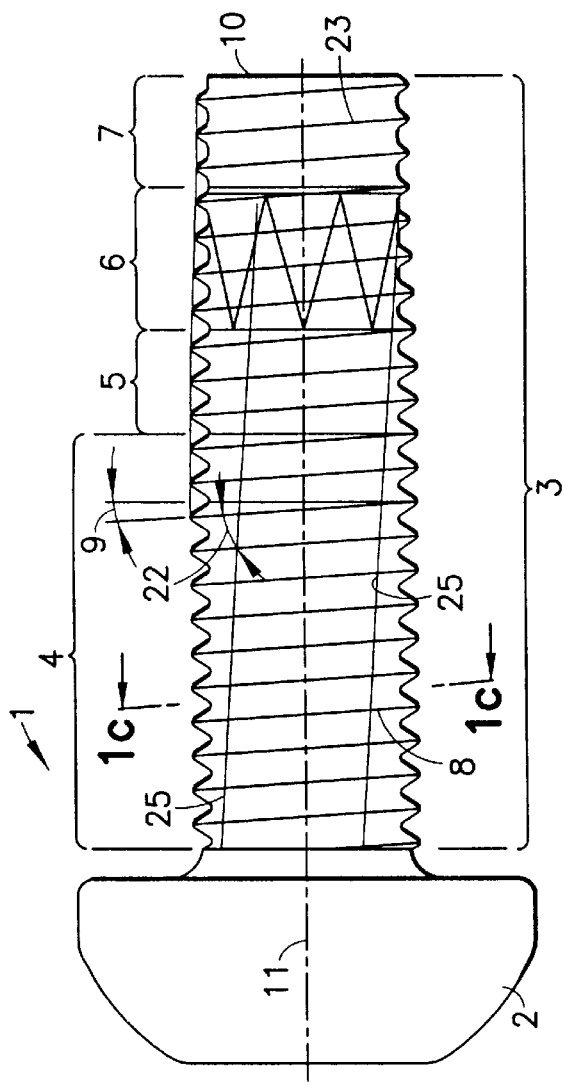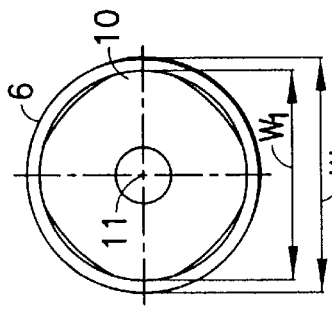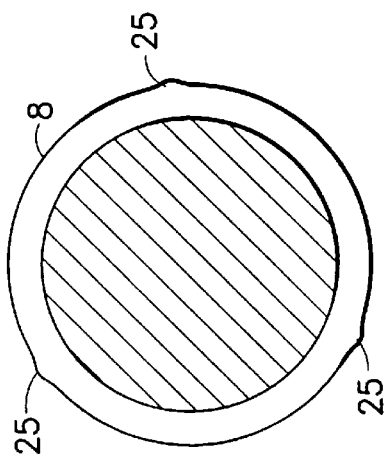

LOBULAR FASTENER WITH RECTILINEAR PITCH PROFILE

BACKGROUND OF THE INVENTION

The invention of this application involves an improved design of a thread forming fastener and a unique method of forming threads in a work piece. The thread forming fastener, with which this application is concerned, generates a thread within a pilot hole of a workpiece as the fastener is driven into the hole. The thread in the work piece is cold formed or swaged by the fastener. In the cold forming process, the fastener deforms the material of the work piece and therefore creates a significant amount of friction which must be overcome by the driving force applied to the fastener.

In order to reduce the driving force required in the use of thread forming fasteners, a trilobular design was developed which provides the fastener with a pitch cross section of arcuate triangular shape. Such a cross section includes alternating high and low portions on the crest of the fastener as it progresses along the pitch surface. Initially this shape was formed over the full length of the fastener. This provided a reduction in the required driving torque as thread forming was accomplished through engagement of only the high portions of the fastener thread, thereby sharply reducing the friction caused by the fully engaged circular thread configuration. The reduced thread engagement, however, still existed when the fastener was fully engaged and therefore detracted from the holding power of the fastener. Although fasteners of this type had good thread forming qualities at reasonable driving torque, they lacked the superior holding capability of a standard cylindrical crested thread. There is an inherent conflict of design in this type of fastener between the desired low driving torque of the thread forming and the desired high surface contact or holding power of the cylindrical thread.

An early fastener of a lobular design is shown in the reference Phipard, Jr., U.S. Pat. No. 3,246,556 which describes a fastener having a holding zone 8 of circular cross section at the top of the fastener and a thread forming zone of tapered lobular cross section extending the remaining length of the fastener.

In the patent which issued to Muenchinger, U.S. Pat. No. 3,681,963, a trilobular design is introduced with a cross section having more arcuate sides. The shank of the fastener of the '963 patent is divided into zones along its length, namely a circular zone and a tapered zone. The trilobular shape is confined to the tapered zone and it is this zone that forms the thread in the workpiece while the circular or cylindrical zone provides the full surface contact and holding power of a standard fastener. Typically the thread forming or tapered zone is of short length involving between 2 to 3 pitches of the thread. This means that all of the thread forming work is accomplished in this distance.

A problem with the multi-zone configuration is that it is difficult to obtain fully formed crested threads on the fastener in the transition zone between the trilobular cross section and the circular cross section. This problem is not clearly recognized in either the '556 or '963 patents. The cross section of the fastener in the transition zone does not allow for a symmetrical application of force by the opposing die and this will hinder the formation of fully crested threads on the fastener, even at the apex of the lobes, in the thread forming zone. This is critical as it is the fastener threads in this zone that completes the forming of the threads in the work piece to their full diameter.

The forming of threads on a multi-zoned blank having differing diameters, i.e., in the holding zone and the pilot zone, creates a differential in rotational distance for each zone as threads are formed on the blank in the roll die. The blank in the smaller diameter zone tends to move faster. This creates a force on the blank that will lap material over the crest of the fastener and results in a poorly formed thread. Since, in the case of the trilobular cross section, the width across the blank remains the same, no relief from this problem is provided. It is the purpose of this invention to provide such relief and allow slippage during the rolling process which will allow threads to be formed in the forming and holding zones without detrimental laps on the thread flanks.

Another problem of the multi-zoned fasteners of the prior art is the thread forming work must occur in the relatively short tapered thread section of two to three pitches. This forces all of the work to be accomplished by only six to nine lobes of the fastener, thereby increasing the torque necessary to perform the work and places an even greater burden on the poorly formed threads of this section of the fastener. In practice it has been found that users of these fasteners tend to use a larger pilot hole to overcome the high installation torque otherwise required. This reduces the engagement of the fastener threads in the work piece to a maximum of 70 to 75 percent of the theoretical maximum.

A more recent trilobular fastener design is described in the reference Fulmer, U.S. Pat. No. 5,242,253. This design adds a third alignment zone at the insertion end of the fastener. In addition the lobes of the threads have a heel following the thread forming arc of the lobes which provides increased friction relief. Since the lobes are arranged in a spiral which is transverse to the thread spiral an enhanced holding pattern is touted over the axial aligned lobe of prior configurations because the material of the work piece tends to fill in behind the heel. There is an attempt in the '253 patent to form fully crested threads in the trilobular transition zone by using a blank that is cylindrical over its full length and not tapered. This produces similar problems to the multi-lobed fasteners in that the lobes in the transition zone are poorly formed due to the round body dominating the rolling and allowing pressure to be applied to the changed cross section.

The configuration of the '253 patent will also cause problems in the gauging of the fastener. In measuring the pitch diameter of the fastener, rollers are used which engage the fastener at three locations about the periphery of the fastener. If the gauge rollers cannot contact surfaces which are radially aligned a faulty reading may occur.

It is the purpose of this invention to construct a fastener in which the holding power is maximized while minimizing the frictional effects of the thread forming process and facilitating the gauging of the finished fastener. The thread forming stress on the fastener is carefully balanced with its strength and the thread stripping limits of the workpiece to avoid the common installation problems, while insuring a greater engagement of the fastener threads in the workpiece, thereby increasing the load carrying ability of the engaged fastener. The overall shape of the fastener is designed for ease of manufacture while insuring a fully crested thread throughout the length of the fastener and complete working lobes particularly at the transition section between the circular cross section of the holding zone and the lobular cross section of the thread forming zone.

SUMMARY OF THE INVENTION

A fastener is constructed having four thread zones constructed over the length of the fastener, from the head to the tip, namely a cylindrical holding zone, a transition thread forming zone, a tapered thread forming zone, and an alignment zone. The pitch cross section of the thread varies in each zone.

At the tip, in the alignment zone, the pitch cross section is reduced in diameter from the holding zone and consists of a substantially arcuate lobular shape of rectilinear cross section having constant dimensions throughout the alignment zone. The tapered thread forming zone is adjacent to the alignment zone and continues the arcuate, rectilinear, lobular cross section, but it gradually increases in width in order to taper to the larger thread diameter of the holding zone. The holding zone is constructed of a substantially circular cross section except for ridges arranged in a spiral pattern over the length of the holding zone. The spiral pattern of the ridges forms an angle of 90° with the threads of the holding zone.

The transition thread forming zone includes an overlapping section in which the rectilobular cross section of the tapered thread forming zone merges with the ridged cross section of the holding zone to allow the ridges to complete the thread forming function. The combined thread forming of the tapered thread forming and transition thread forming zones is extended over more than eight pitches. With four lobes per pitch provided by the rectilinear cross section, the bulk of the thread forming work is distributed over at least twenty lobes. This reduces the maximum force required to form the threads. The rectilinear pitch cross sections of the tapered and alignment zones allow symmetrical forces to be applied to the fastener blank as the threads of the fastener are rolled. This provides a more complete thread depth in the fastener then was possible in prior art transition sections.

DESCRIPTION OF THE DRAWING

The preferred embodiment of the invention is described in more detail below with reference to the attached drawing in which:

FIG. 1a is a side view of the fastener of this invention;

FIG. 1b is an end view of the fastener of this invention;

FIG. 1c is a cross sectional view of the holding zone of the fastener of this invention

DESCRIPTION OF THE PREFERRED EMBODIMENT

Figure 7:
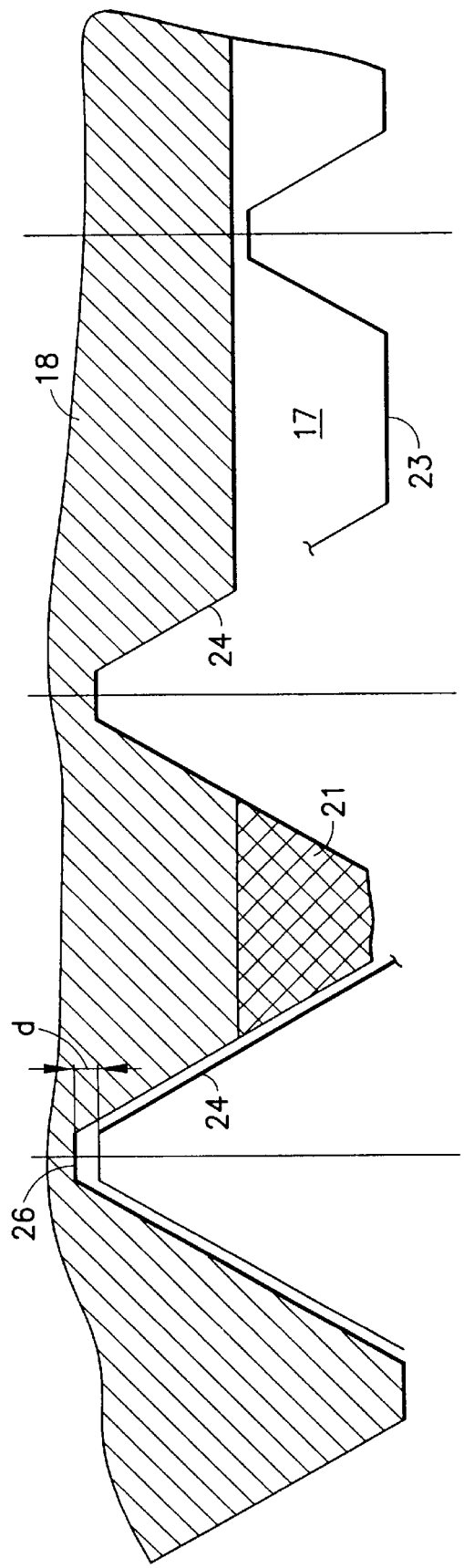
FIG. 7 is a sectional view of the work piece showing a partially formed pilot hole.

The fastener of this invention is a thread forming fastener 1 which is intended to be inserted into a pilot hole 17 in a work piece 18, as shown in FIG. 7, and turned to form mating threads in the hole by means of cold forming. In the forming process, material, shown as shaded area 21 in FIG. 7, at the periphery of the hole 17, is displaced and moved to form the threads in the workpiece. The cold forming process is friction intensive and requires significant installation torque which must be controlled to avoid fracturing the fastener or stripping the threads in the work piece, either of which will cause an installation failure.

The fastener 1 of this invention is shown in FIG. 1 and comprises a head 2 with a shank 3 extending downward therefrom and terminating in lower end or tip 10. The shank 3 of the fastener 1 is divided into 4 distinct zones between the head 2 and the tip 10, namely, holding zone 4, transition thread forming zone 5, tapered thread forming zone 6, and pilot or alignment zone 7. Each of the zones 4 through 7 has a different pitch cross section as described below.

The holding zone 4 consists of a cylindrical portion of fastener 1 having threads 8. The threads 8 in zone 4 are of a constant radius from the axis 11 of the shank 3 and spiral downward at a helix angle 9 on the shank in the standard manner. The threads 8 are fully crested to provide maximum holding engagement with the threads formed in the pilot hole 17 of the work piece 18. It is desirable to provide a slightly ridged cross section in the holding zone 4, as shown in FIG. 1c. Ridges 25 are constructed on shank 3 in the holding zone 4 and extend through the transition thread forming zone 5 and into tapered thread forming zone 6. The ridges 25 provide the final material displacement in the transition thread forming zone 5 and serve to reduce the installation torque required to complete the thread forming. The ridges 25 are positioned in an elongated spiral which forms an angle 22 with threads 8 of approximately 90° (see also FIG. 1a). It has been found that a ridge angle 22 of between 80° and 110° provides good thread surface finish during the final thread forming in zone 5 and allows for accurate gauging.

Figure 2:
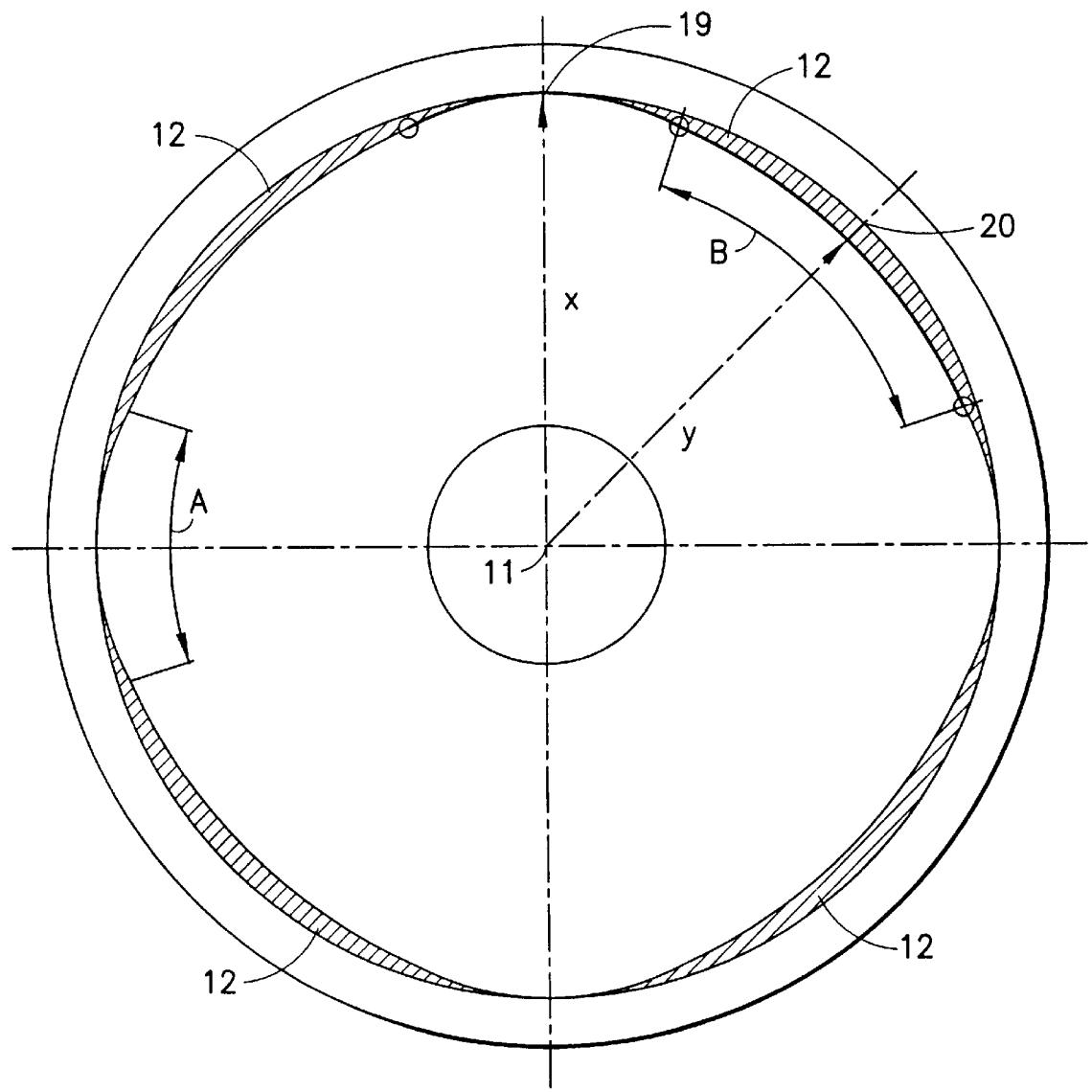
FIG. 2 is an enlarged pitch cross sectional view of the rectilobular shape of the fastener of this invention.
Figure 6:
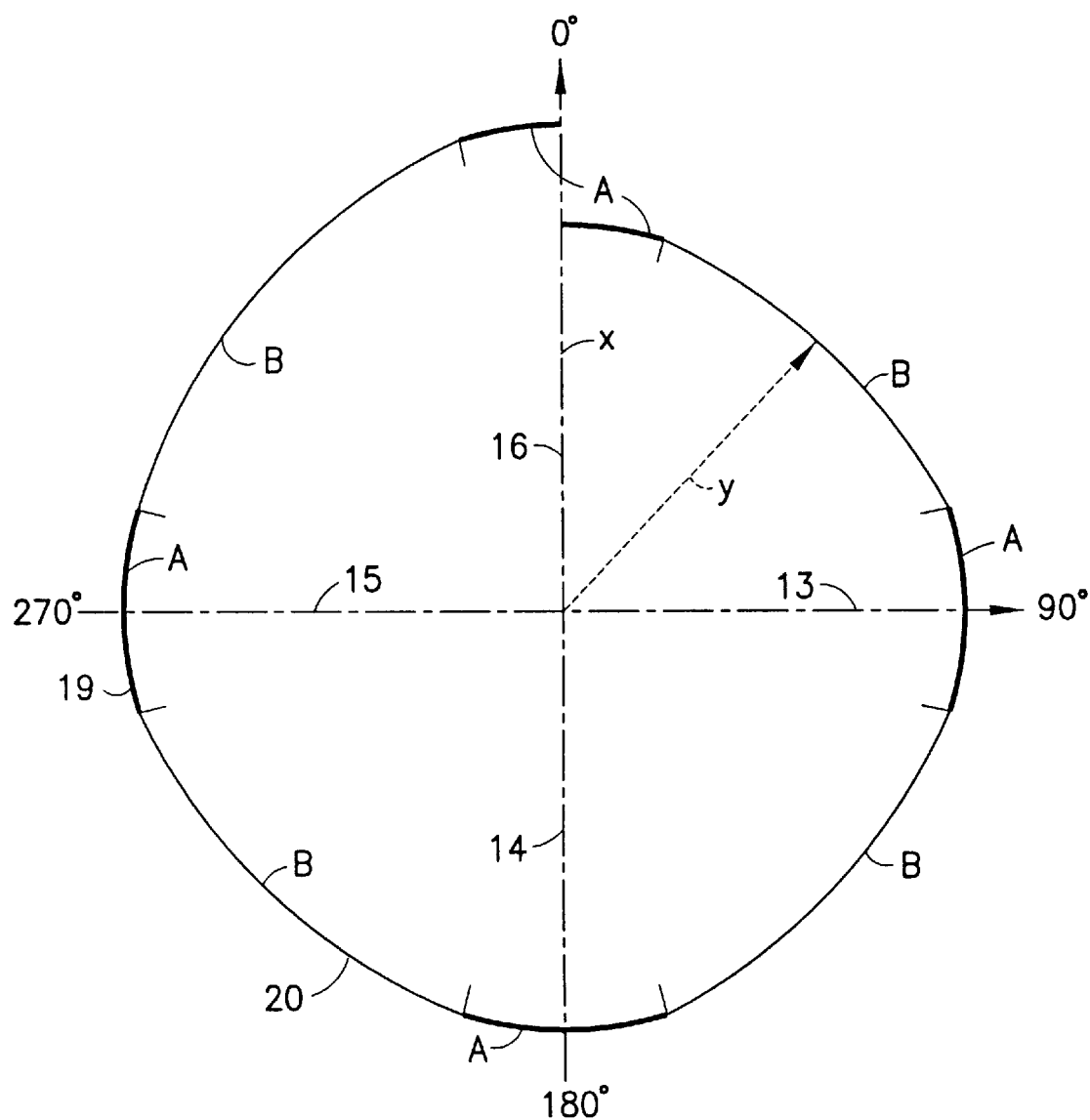
FIG. 6 is an end view of the thread forming zone cut to show one full pitch of the thread of the fastener of this invention.

The pilot zone 7 consists of a section of the fastener 1 at its tip 10 having a rectilobular pitch cross section of constant dimensions throughout the zone. In this zone, the fastener 1 is constructed having a portion 23 of continuous threads 8 spiraling downward at a helix angle 9. The threads 8 within the zones 6 and 7 are constructed with an arcuate rectilobular profile as shown in FIGS. 2 and 6. As shown in FIG. 1b, the width $w_1$ of the fastener 1 in zone 7 is reduced slightly from the width $w_2$ of the fastener 1 in zone 4. This allows the insertion of the alignment zone into the pilot zone to establish proper engagement. The four lobes of the pitch profile will assist in the alignment of the fastener in the pilot hole without canting the axis 11 resulting in an accurate engagement of a single lobe crest which efficiently initiates the thread forming process.

In order to check the pitch diameter of the holding zone 4, a series of gauge rollers are positioned about the periphery of the fastener 1 in zone 4. In this configuration, the gauges may be aligned with the ridges 25 because of the selection of a helix angle which is between 80° and 110°. It is observed that a spirally distributed pronounced ridge cross section with an acute helix angle, as shown for example in U.S. Pat. No. 5,242,253, will interfere with the engagement of the gauge rollers. The rollers will not align with the ridges, but will be partially on and partially off the ridge, thereby engaging the thread at varying pitch diameters. The gauging apparatus currently in use cannot compensate for this irregularity and will provide an inaccurate reading. The controlled three ridged design of the holding zone 4 of this invention successfully solves this problem.

Figure 5:
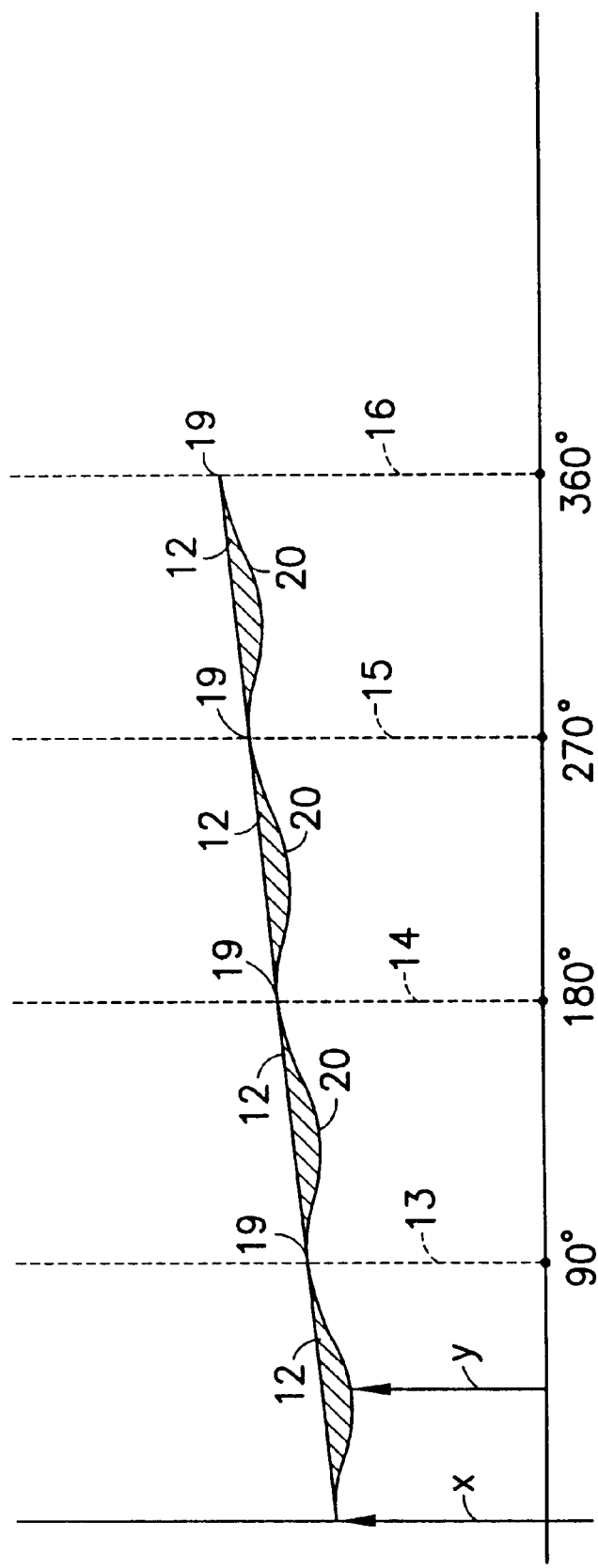
FIG. 5 is a graph showing the undulating shape of the lobulations of the fastener of this invention in the tapered thread forming zone.

The tapered thread forming zone 6 consists of a tapered portion of fastener 1 which transitions between a width, which is slightly less than the width $w_2$ of the threads 8 in zone 4, and the reduced width $w_1$ of the threads 8 in zone 7. Threads 8 continue through zone 6 into zone 7 and, as shown in FIGS. 2 and 6, have a rectilobular profile. This unique profile consists basically of arcuate segments A and B which merge to form a continuous curvature as shown in FIG. 6. In the preferred embodiment four lobes of smaller radius of curvature (apex 19) are connected by four arcuate segments 20 of slightly larger radius of curvature. FIG. 5 shows in graphical form the undulations of the thread profile curvature in zone 6 by a representation of the distance of the thread circumference from the axis 11. Since zone 6 is tapered, the radial widths 13, 14, 15, and 16 are gradually increasing, as shown in FIGS. 5 and 6. The relief provided by this lobular profile is the clearance 12, which is the difference between the distance x from the axis of the apex 19 of the lobe A and the distance y from the axis of the apex 20 of the arcuate segment B of the profile. In function the radius of curvatures of the arcuate segments A and B are designed such that only the lobe A will form threads.

A transition thread forming zone 5 is constructed in the portion of fastener 1 between the tapered thread forming zone 6 and the cylindrical holding zone 4. As previously described, zone 4 is constructed with a series of ridges 25. In the preferred embodiment these ridges extend downward on the shank 3 of the fastener 1 through zone 5 and partially into zone 6. The cross section of zone 5 is cylindrical but is slightly tapered to accommodate the difference in the dimensions of zones 4 and 6. The result is that, although a majority of the forming work is accomplished in zone 6 the threads in the pilot hole 17 are completed in the transition thread forming zone 5, thereby providing a substantially full depth thread in the pilot hole 17. This is shown graphically in FIG. 4.

In order to maximize the thread forming performance of the fastener, the lobes formed by the thread forming arcs A are designed such that the radius of curvature of the arcs A is reduced as much as possible consistent with the formation of a smooth overall arcuate contour. The shape of the rectilobular profile is selected to maximize the arcuate nature of the contour. This is accomplished by enlarging the radius of curvature of arc B.

Figure 3:
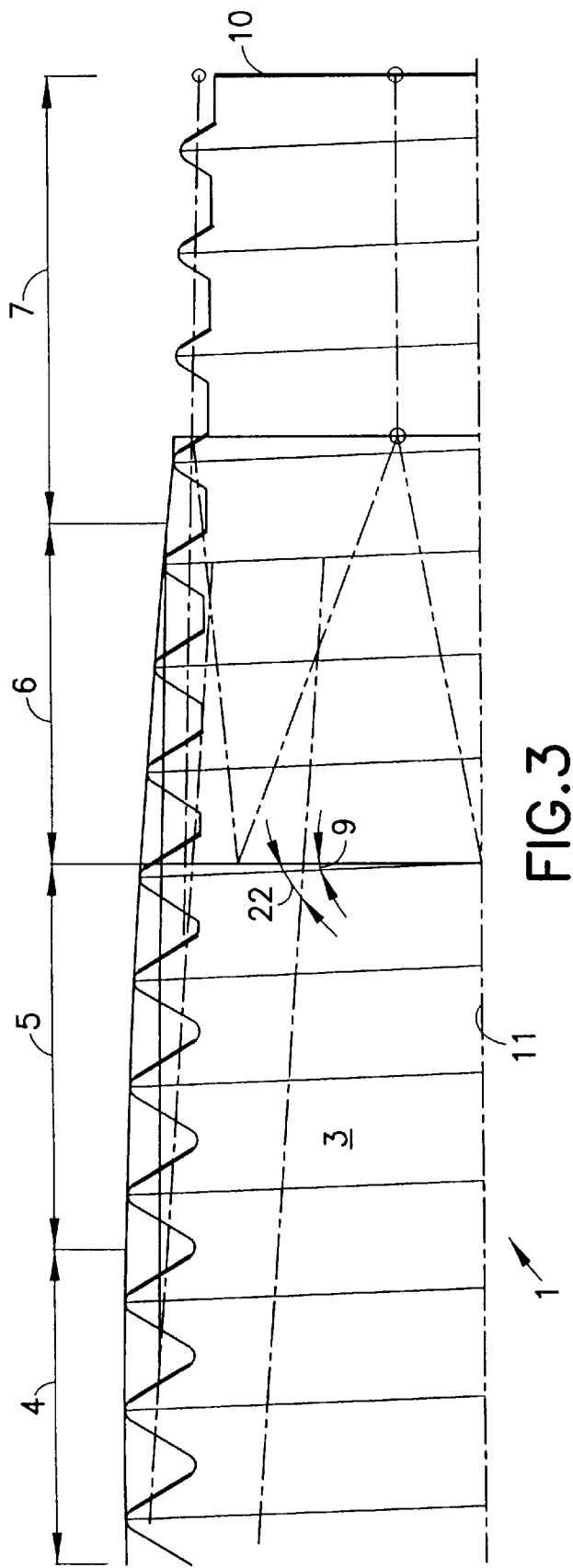
FIG. 3 is side close up view of the thread forming zones of the fastener of this invention.
Figure 4:
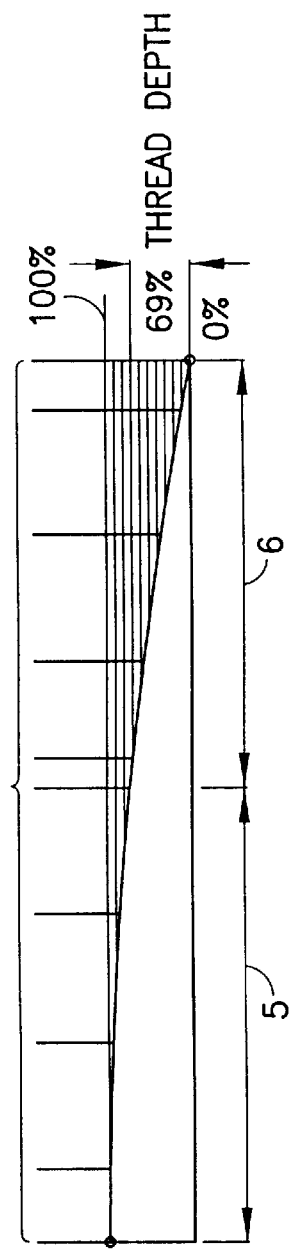
FIG. 4 is a graph showing the distribution of work in the thread forming zones of the fastener of this invention.

The four sided pitch cross section of this invention helps overcome the deficiencies of prior art fastener designs and allows the benefits of the multi-zoned fastener to be realized, namely, to reduce installation torque without impairing the holding efficiencies of the fastener. This is accomplished by the increased number of thread forming lobes that are available and by extending the thread forming function of the fastener over an increased number of pitches. As illustrated in FIGS. 3 and 4, it has been found advantageous to extend the tapered thread forming zone 6 to the range of four to eight pitches with the transition thread forming zone 5 being in the range of three to four pitches. It should be noted that this provides a total thread forming distance of between eight to twelve pitches. By spreading the work being done over a greater thread distance, the instantaneous torque required at any point is reduced.

The trilobular cross section of the blank of the prior art tended to create alternating under cut areas. This is created by the irregular intersection of the diverse pitch cross sections. These undercut areas, prevented symmetrical engagement of the flat fastener rolling dies at the intersection of the holding and tapered sections making it difficult to form fully crested threads in this section of the blank. The use of a rectilinear profile, as shown in FIGS. 2 and 6, provides balanced under cuts and avoids this problem, thereby facilitating the generation of more complete thread depths.

In the process of thread forming of this invention, the four zoned threaded fastener 1 is inserted in a predrilled pilot hole 17 in contact with four symmetrically constructed lobes of the fastener 1. As the fastener is advanced into the pilot hole 17, the expanding lobes of the tapered thread forming zone 6 begin to form threads by displacing material 21, as shown in FIG. 7. By advancing the fastener 1 through at least 4 pitches, the thread is almost fully formed in the pilot hole 17. By providing only a slight taper in the transition thread forming zone 5 and extending the ridges 25 through this zone, the ridges become the thread forming means after the rectilobular cross section merges into the ridged cylindrical cross section of the remaining zones. In order to finish the thread forming process, the fastener is advanced further through at least 3 pitches to enable the ridges 25 to burnish and size the threads previously formed. This finishing step has allowed the formation of threads which conform to nut thread specifications. This allows the use of machine fasteners as replacements for the thread forming fasteners of this invention. The final step of the process is illustrated in FIG. 7 by the comparison of the thread profile 24 formed by the rectilobular threads of zone 6 with the thread profile 26 formed by the ridged profile of the zone 5. This illustrates a difference of d in the thread depth formed by succeeding zones 6 and 5 respectively. The distance d corresponds to the height of the ridges 25.

In this manner there is provided a fastener which is constructed to balance the competing design goals to provide a self threading fastener which is capable of forming a fully crested thread in the work piece without requiring an installation torque which risks fracturing the fastener or stripping the threads. In addition superior holding performance is achieved.

I claim:

1. A fastener constructed to form threads in a hole in a work piece, said fastener having a head at its upper end, a shank extending downward from the head, said shank terminating in a lower end, said shank having continuous threads formed therein with a first helix angle, and comprising:

an upper zone extending downward from the head and having threads formed therein, said threads of said upper zone having a circular cross section of a substantially constant diameter;

a lower zone extending upward from the lower end and having threads formed therein, said threads of said lower zone having an arcuately lobular cross section of a constant width, said width being smaller than said diameter of said upper zone;

a first intermediate zone having threads formed therein and constructed to join the lower zone and extend upward therefrom, said threads of said first intermediate zone having an arcuately lobular cross section which gradually increases in size from the width of the lower zone to slightly less than the diameter of the upper zone; said threads constructed to provide primary forming of a thread in the hole; and a second intermediate zone constructed to join the first intermediate zone with the upper zone and having threads formed therein, said threads of said second intermediate zone having a circular cross section which tapers in diameter from slightly less than the diameter of the upper zone to equal to said diameter of the upper zone, said threads constructed to provide secondary forming of a thread in the hole.

2. A fastener constructed to form threads in a hole in a work piece, said fastener having a head at its upper end, a shank extending downward from the head and terminating in a lower end, said shank having continuous threads formed therein with a first helix angle, as described in claim 1, wherein the upper zone is constructed with a plurality of spirally spaced ridges, said ridges positioned along the upper zone in a spiral extending transverse to the first helix angle, said ridges locally expanding the substantially constant diameter of the circular cross section.

3. A fastener constructed to form threads in a hole in a work piece, said fastener having a head at its upper end, a shank extending downward from the head and terminating in a lower end, said shank having continuous threads formed therein with a first helix angle, as described in claim 1, wherein the first and second intermediate zones extend for at least a combined 7 pitches of the thread.

4. A fastener constructed to form threads in a hole in a work piece, said fastener having a head at its upper end, a shank extending downward from the head and terminating in a lower end, said shank having continuous threads formed therein with a first helix angle, as described in claim 1, wherein the first intermediate zone extends for at least 4 pitches of the thread.

5. A fastener constructed to form threads in a hole in a work piece, said fastener having a head at its upper end, a shank extending downward from the head and terminating in a lower end, said shank having continuous threads formed therein with a first helix angle, as described in claim 1, wherein the second intermediate zone extends for at least 3 pitches of the thread.

6. A fastener constructed to form threads in a hole in a work piece, said fastener having a head at its upper end, a shank extending downward from the head and terminating in a lower end, said shank having continuous threads formed therein with a first helix angle, as described in claim 1, wherein the arcuately lobular cross section of the lower and first intermediate zones comprises at least four spirally spaced arcuate lobes, having a first radius of curvature adjacent to connecting arcuate segments having a different radius of curvature, the relative radii of curvature of the lobe and the connecting arcuate segments provides engagement of the thread only at the arcuate lobes.

7. A fastener constructed to form threads in a hole in a work piece, said fastener having a head at its upper end, a shank extending downward from the head and terminating in a lower end, said shank having continuous threads formed therein with a first helix angle, as described in claim 2, wherein the ridges of the upper zone extend downward on the shank through the second intermediate zone and partially into the first intermediate zone.

8. A fastener constructed to form threads in a hole in a work piece, said fastener having a head at its upper end, a shank extending downward from the head and terminating in a lower end, said shank having continuous threads formed therein with a first helix angle, as described in claim 2, wherein the ridges of the upper zone extend downward on the shank through the second intermediate zone and partially into the first intermediate zone, said ridges positioned in a spiral having a second helix angle which is 80° to 110° greater than the first helix angle.

9. A fastener constructed to form threads in a hole in a work piece, said fastener having a head at its upper end, a shank extending downward from the head, said shank terminating in a lower end, said shank having continuous threads formed therein with a first helix angle, and comprising:

an upper zone extending downward from the head and having threads formed therein, said threads of said upper zone having a circular cross section of a substantially constant diameter, wherein the upper zone is further constructed with a plurality of spirally spaced ridges, said ridges positioned along the upper zone in a spiral extending transverse to the threads, said ridges locally expanding the substantially constant diameter of the circular cross section a lower zone extending upward from the lower end and having threads formed therein, said threads of said lower zone having an arcuately lobular cross section of a constant width, said width being smaller than said diameter of said upper zone;

a first intermediate zone having threads formed therein and constructed to join the lower zone and extend upward therefrom, said threads of said first intermediate zone having an arcuately lobular cross section which gradually increases in size from the width of the lower zone to slightly less than the diameter of the upper zone; said threads constructed to provide primary forming of a thread in the hole, and further wherein the arcuately lobular cross section of the lower and first intermediate zones comprises at least four spirally spaced arcuate lobes, having a first radius of curvature adjacent to connecting arcuate segments having a different radius of curvature, the relative radii of curvature of the lobe and the connecting arcuate segments provides engagement of the thread only at the arcuate lobes; and a second intermediate zone constructed to join the first intermediate zone with the upper zone and having threads formed therein, said threads of said second intermediate zone having a circular cross section which tapers in diameter from slightly less than the diameter of the upper zone to equal to said diameter of the upper zone, said threads constructed to provide secondary forming of a thread in the hole.

10. A fastener constructed to form threads in a hole in a work piece, said fastener having a head at its upper end, a shank extending downward from the head, said shank terminating in a lower end, said shank having continuous threads formed therein with a first helix angle, as described in claim 9, wherein the ridges of the upper zone extend downward on the shank through the second intermediate zone and partially into the first intermediate zone, said ridges positioned in a spiral having a second helix angle which is 80° to 110° greater than the first helix angle.

11. A fastener constructed to form threads in a hole in a work piece, said fastener having a head at its upper end, a shank extending downward from the head, said shank terminating in a lower end, said shank having continuous threads formed therein with a first helix angle, and comprising:

an upper zone extending downward from the head and having threads formed therein, said threads of said upper zone having a circular cross section of a substantially constant diameter and having means constructed on said cross section to provide friction relief during installation;

a lower zone extending upward from the lower end and having threads formed therein, said threads in said lower zone having an arcuately lobular cross section of a constant width, said width being smaller than said diameter of said upper zone, wherein said arcuately lobular cross section provides a balanced engagement profile to avoid canting of the fastener in the hole;

a first intermediate zone having threads formed therein and constructed to join the lower zone and extend upward therefrom, said threads of said first intermediate zone having an arcuately lobular cross section similar to that of the lower zone, which gradually increases in size from the width of the lower zone to slightly less than the diameter of the upper zone; and a second intermediate zone constructed to join the first intermediate zone with the upper zone and having threads formed therein, said threads of said second intermediate zone having a circular cross section which tapers in diameter from slightly less than the diameter of said upper zone to equal to said diameter of said upper zone, wherein the friction relief of said upper zone extends downward into said second intermediate zone to provide finish forming of a thread in the hole.

12. A fastener constructed to form threads in a hole in a work piece, said fastener having a head at its upper end, a shank extending downward from the head, said shank terminating in a lower end, said shank having continuous threads formed therein with a first helix angle, as described in claim 10, wherein said arcuately lobular pitch cross sections of said lower and first intermediate zones is constructed having at least 4 thread forming lobes.

13. A process of forming a thread in a predrilled hole in a work piece using a fastener constructed having a head at its upper end, a shank extending downward from the head, said shank terminating in a lower end, said shank having continuous threads formed thereon, comprising the steps of: constructing a fastener having four zones progressing from the lower end of the shank to the upper end of the shank, a lower zone constructed with a thread having lobular pitch cross section of constant width said fastener thread pitch cross section having at least four lobes balanced around said cross section, a first intermediate zone constructed with a thread having a tapered lobular pitch cross section having said at least four lobes, a second intermediate zone constructed with a thread having a tapered circular cross section constructed with ridges, and an upper zone constructed with a thread having a circular pitch cross section of substantially constant diameter constructed with ridges, said ridges of said upper and second intermediate zones locally expanding said substantially constant or tapered diameter of said circular pitch cross sections;

inserting the fastener in the hole by engaging the balanced pitch cross section of the fastener thread of said lower zone;

advancing the fastener thread to initiate thread forming in the hole by engaging the lobes of the fastener thread of the first intermediate zone;

continuing the thread forming by advancing the fastener thread within the hole through at least four pitches comprising the first intermediate zone;

advancing the fastener thread to initiate finish thread forming in the hole by engaging the ridges of the fastener thread in the second intermediate zone;

continuing the thread forming by advancing the fastener thread within the hole through at least three pitches of the thread comprising the second intermediate zone; and completing the installation of the fastener within the hole by advancing the fastener thread within the hole to engage the cylindrical ridged cross section of the fastener thread in the upper zone of the fastener with the fully formed threads in the hole.

14. A process of forming a thread in a predrilled hole in a work piece using a fastener constructed having a head at its upper end, a shank extending downward from the head, said shank terminating in a lower end, said shank having continuous threads formed thereon, as described in claim 11 wherein the step of continuing the thread forming by advancing the fastener thread within the hole through the first intermediate zone comprises advancing the fastener thread through a range of between 4 to 8 pitches of the fastener thread.

15. A process of forming a thread in a predrilled hole in a work piece using a fastener constructed having a head at its upper end, a shank extending downward from the head, said shank terminating in a lower end, said shank having continuous threads formed thereon, as described in claim 11 wherein the step of continuing the thread forming by advancing the fastener thread within the hole through the second intermediate zone comprises advancing the fastener thread through a range of between 3 to 4 pitches of the fastener thread.

* * * * *